Oct. 11, 1938.  G. A. WAHLMARK  2,132,813
ROTARY ENGINE
Original Filed June 10, 1933  3 Sheets—Sheet 1
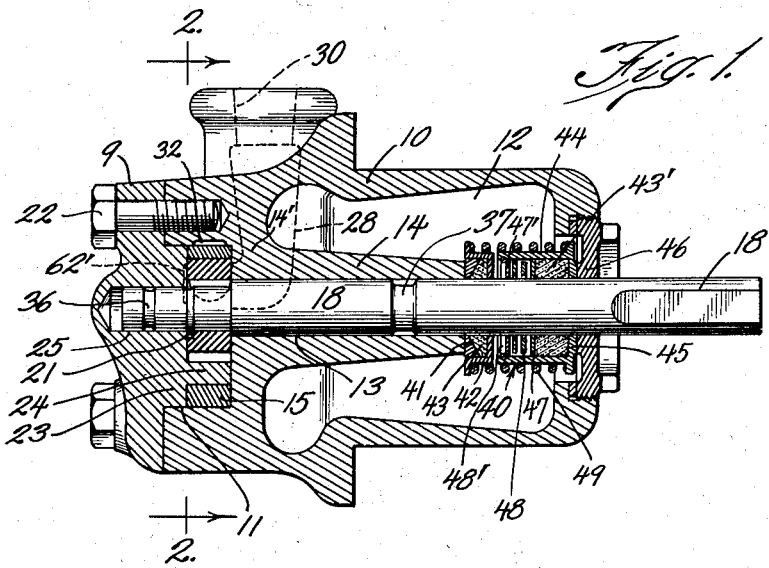
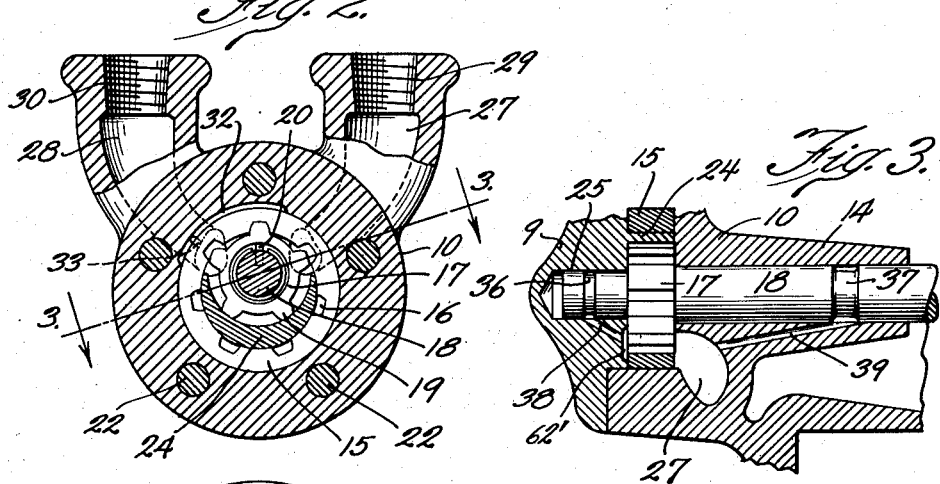
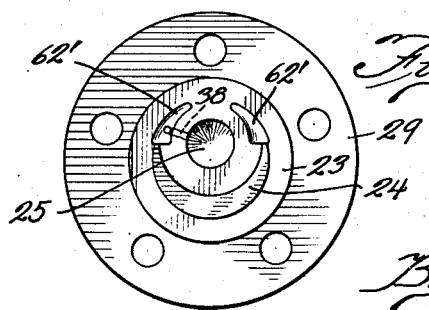
Inventor:
Gunnar A. Wahlmark
By Axel A. Hofgren
his Atty.

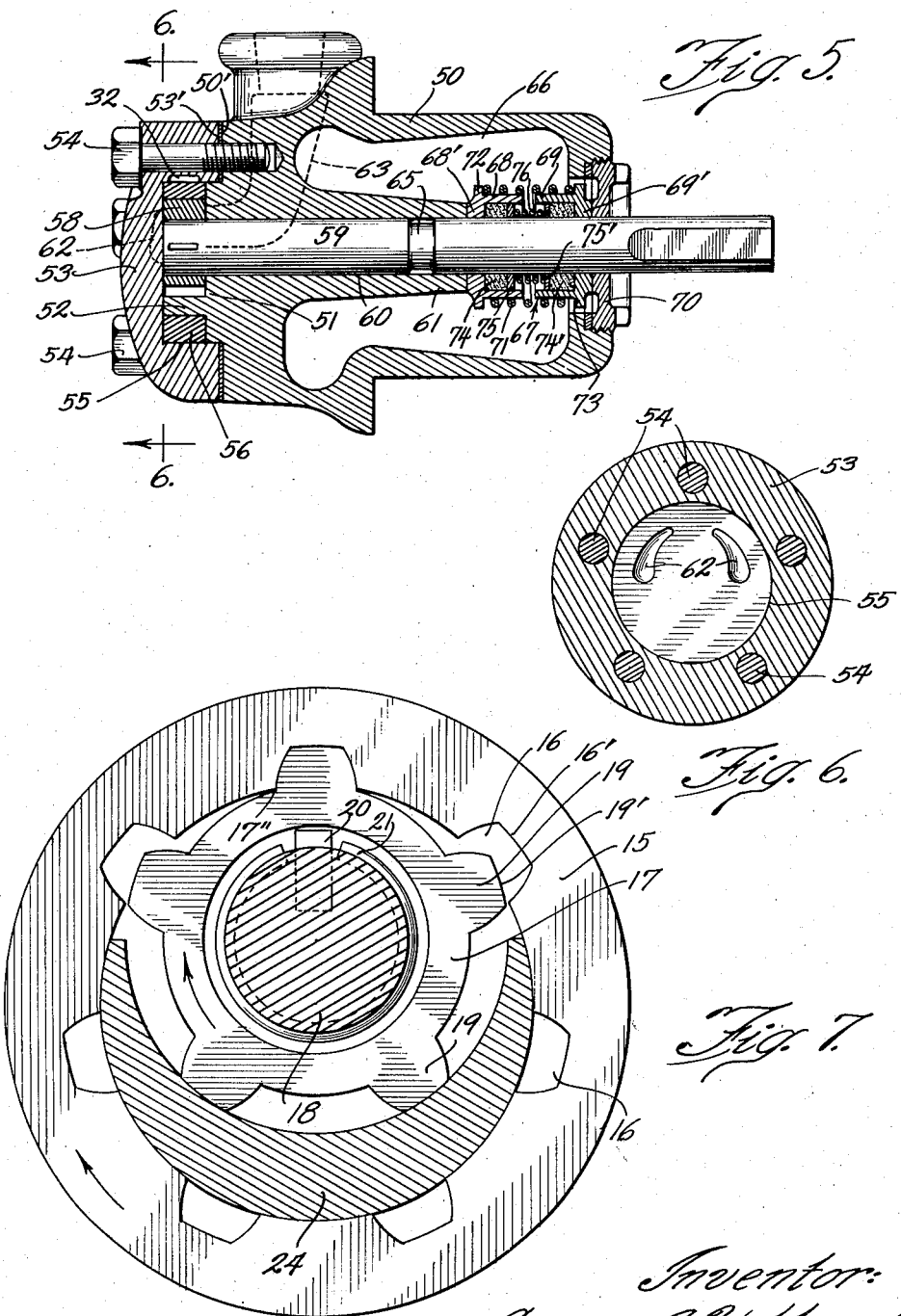

Oct. 11, 1938.   G. A. WAHLMARK   2,132,813
ROTARY ENGINE
Original Filed June 10, 1933   3 Sheets-Sheet 3
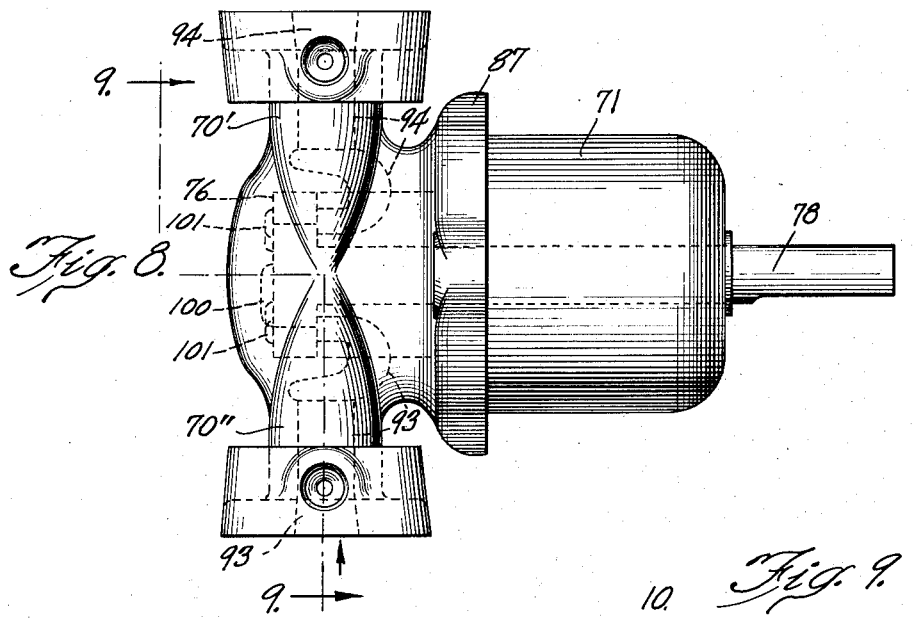
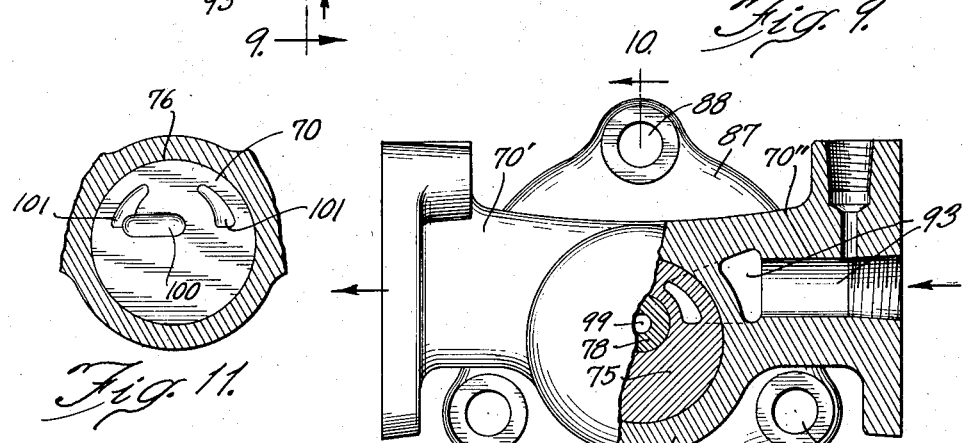
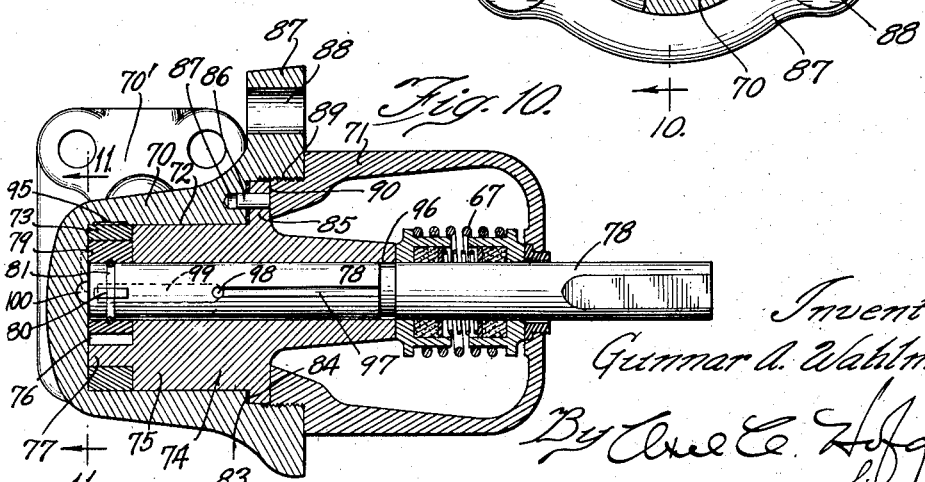

Patented Oct. 11, 1938

2,132,813

UNITED STATES PATENT OFFICE 2,132,813

ROTARY ENGINE

Gunnar A. Wahlmark, Rockford, Ill.

Application June 10, 1933, Serial No. 675,218
Renewed March 1, 1938

9 Claims. (Cl. 103—126)

More particularly this invention relates to engines of the rotary type and has as an object the provision of a new and improved device which is simple in construction and efficient in operation.

Commercial rotary pumps have generally been of two types, gear pumps and vane pumps. Gear pumps of the spur and herring bone gear type have been limited as to speed, 1200 R. P. M. being the maximum in most instances although some can be operated at 1800 R. P. M. The maximum hydraulic pressure that these pumps develop is approximately 1000 pounds per square inch, but in almost all cases they develop a maximum pressure of from 400 to 500 pounds per square inch. Internal gear pumps have been operated at higher speeds, for example 3600 R. P. M., but this has been accomplished in only a few instances, 1200 to 1800 R. P. M. being the general practice. Maximum hydraulic pressures on these pumps have been around 400 to 500 pounds per square inch and the maximum air pressure has been around 125 pounds per square inch. Both the spur and herring bone gear pumps produce pulsations in the flow.

Rotary pumps of the vane type have a maximum speed of about 1800 R. P. M. with a maximum hydraulic pressure of about 1500 pounds per square inch, and air pressure around 150 pounds per square inch. Pumps embodying pistons and cylinders develop extremely high hydraulic pressures. For example, hydraulic pressures of 5000 pounds per square inch, and air pressures around 150 pounds per square inch are obtainable, but the speed at which this type of pump can generally be operated is between 300 to 600 R. P. M., excepting some small capacity pumps which run as high as 1200 R. P. M., and some small capacity air compressors which run as high as 1800 R. P. M. There are always pulsations in the flow. Commercial rotary pumps are too inefficient for any but very restricted use as fluid motors and piston pumps can only be used as fluid motors by employing a multiplicity of pistons which makes the structure too complicated for general use.

It is another object to provide a new and improved rotary engine capable of running at high and low speeds and of producing an extremely high vacuum and pressure at both high and low speeds, wherein the pressure producing parts engage with a rolling action and are balanced hydraulically so as to eliminate friction and leakage and to obtain quiet operation at all speeds.

Another object is to provide a new and improved rotary engine which is not only widely adaptable as a pump but also as a fluid motor.

Another object is to provide a construction of such nature that the rotating pressure producing parts can have a running fit as close as the most closely ground and lapped fit of a piston and cylinder, and will give the same high volumetric efficiency as a piston and cylinder machined with extreme accuracy.

Another object is to provide a new and improved rotary engine in which the pressure producing parts engage with a rolling action similar to that of a roller against the outer race of a roller bearing, so as to obtain high mechanical efficiency and high volumetric efficiency.

Another object is to provide a rotary engine of this character which provides a uniform flow that is free from pulsations at all speeds.

Another object is to provide such a structure wherein the pressure producing parts which engage with a rolling action can have a predetermined pressure or preload on the rolling contact forming the rolling seal, and embodying means for maintaining the preload on the parts and for balancing the parts hydraulically.

It is another object of this invention to provide a rotary pump which may be operated at extremely high speeds if desired, 6000 R. P. M. being obtainable, and which develops unusually high hydraulic and air pressures, hydraulic pressures of from 300 to 5000 pounds per square inch, and air pressures of from 600 to 700 pounds per square inch, being obtained with a smooth fluid flow and no vibration.

Another object is to provide a rotary engine embodying a roller and ring having interengaging splines and recesses arranged to provide a rolling seal therebetween substantially unbroken during continued rotation of the parts, the splines having the form of the addenda only of involute teeth and being so spaced as to permit of the elimination of timing gears with but relatively few splines.

Further objects will become readily apparent from the following detailed description taken in connection with the accompanying drawings, in which:

Fig. 1 is a longitudinal central section through one form of the invention.

Fig. 2 is a section along the line 2—2 of Fig. 1.

Fig. 3 is a fragmentary section along the line 3—3 of Fig. 2.

Fig. 4 is a view looking at the inner end of the left hand part of the casing of the device shown in Fig. 1.

Fig. 5 is a longitudinal central section through another form of the invention.

Fig. 6 is a section along the line 6—6 of Fig. 5.

Fig. 7 is an enlarged view of the rotary parts of the invention as illustrated in Figs. 1 to 4.

Fig. 8 is a plan view of still another form of the invention.

Fig. 9 is a view looking at the left hand end of Fig. 8, and partly in section along the line 9—9 of Fig. 8.

Fig. 10 is a longitudinal central section along the line 10—10 of Fig. 9.

Fig. 11 is a fragmentary section along the line 11—11 of Fig. 10.

Although I have illustrated in the drawings and shall herein describe in detail a preferred form of the invention, together with modifications thereof, particularly adapted for use as pumps, it is to be understood that I do not intend to limit the invention to pumps, or the specific forms and arrangements shown, but aim to cover all modifications and alternative constructions falling within the spirit and scope of the appended claims.

In the preferred form illustrated in the drawings, the invention is embodied in a rotary pump in which the rotor comprises a ring rotatably mounted in a cylindrical chamber in a casing and is driven by means of a roller eccentrically mounted in the casing so as to roll on the inner periphery in said ring, the roller and ring having interengaging splines and recesses and intermediate surfaces formed to engage with a rolling contact so as to provide a mechanical seal between the parts which is substantially unbroken during operation of the pump. The splines may be spaced so as to eliminate the need of timing gears. Referring particularly to Figs. 1 to 4, the form of the invention disclosed therein comprises generally a casing composed of parts 9 and 10, the part 10 having a cylindrical recess 11 in one end thereof, a chamber 12 in the other end thereof, and a bore 13 extending on an axis eccentric to the recess 11 and through an elongated hub 14 formed on a wall 14' between the recesses. A ring 15 having a plurality of peripherally spaced grooves or recesses 16 is positioned in the inner end of the recess 11 and is freely rotatable therein, and is arranged to be driven by means of a roller 17 carried on a shaft 18 in the bore 13, the roller having corresponding peripherally spaced splines 19 intermeshing with the recesses 16 with a rolling action. To aid in retaining a rolling contact even after wear of the pumping elements, the splines 19 on the roller are given an abnormally wide spacing. Preferably, this spacing should not be so great that the splines and recesses no longer serve as timing and driving means but should approximate the maximum spacing which will still permit the splines and recesses to perform that function. As clearly shown in Fig. 7, the splines are spaced by a distance, measured on the circumference of the roller, which is greater than the maximum circumferential width of a spline, that is, the width at the base of the spline. Yet, as previously stated, this spacing is not so great but that a succeeding spline engages with its recess prior to the disengagement of the previous spline with its recess. The roller is herein shown secured to the shaft 18 by means of a key 20 and a split ring 21. The casing part 9 is secured to the left hand end of the casing part 10 (Fig. 1) by means of a plurality of headed screw devices 22, the two parts of the casing having cooperating annular clamping surfaces providing a fluid-tight connection therebetween. In the present form of the invention, the part 9 has a cylindrical portion 23 fitting into the outer end of the recess 11 and carries a segmental guard 24 projecting inwardly between the disengaged portions of the roller 17 and ring 15. The casing part 9 is preferably provided with a bore 25 concentric with the bore 13 in the casing part 10 so as to form a bearing for the adjacent end of the shaft 18.

As illustrated most clearly in Fig. 7, in a preferred form of the invention the roller 17 is formed with a plurality of splines 19, five being shown herein, each of which is in the form of the addendum only of a true involute tooth. The splines are spaced apart two or more normal teeth and the portion intermediate the splines is convex and truly cylindrical. Likewise the ends 19' of the splines are convex and truly cylindrical, the ends of the splines and the intermediate portions constituting parts of circles concentric with the shaft 18. The stator ring 15 is formed with a plurality of transverse recesses 16, seven being here shown, spaced to mesh with the splines on the roller and shaped to conform closely to the shape of the splines. Like the roller, the bottoms 16' of the recesses in the stator ring and the intermediate portions are truly cylindrical, these portions being concave and constituting respectively parts of circles concentric with the axis of the ring 15.

In operation, both the roller and the ring rotate in the same direction with the point of engagement substantially vertically above the axes of the roller and ring. Because of the shape of the splines and recesses and particularly because of the complementary nature of the cylindrical peripheries of the roller and ring the point of engagement is a true rolling contact extending across the full width of the elements. Throughout an entire revolution of the ring 15 the peripheries of the ring and roller remain in engagement, the intermediate portions rolling on one another and the splines being received fully within the recesses so that the tops of the splines roll on the bottoms of the recesses. The splines and recesses are so shaped that the intermediate portions 17" of the roller engage the corresponding portions of the ring substantially simultaneously with the disengagement of the top of the spline from the bottom of the recess and vice versa to obtain a rolling contact between the ring and roller substantially unbroken during operation. The seal between the elements is entirely unbroken because of engagement between the sides of the splines and recesses. Thus as the ring and roller rotate the rolling contact forms an unbroken seal progressing uniformly and uninterruptedly over the entire peripheries of the ring and roller or through 360°. The splines and recesses are preferably so spaced as to time the ring and roller and thereby eliminate the need of any timing gears.

Ports 27 and 28 are formed in the casing communicating at their outer ends with threaded openings 29 and 30 adapted for conduit connections. At their inner ends the ports communicate with the cylindrical recess 11, on opposite sides of the interengaging portions of the roller and ring, and adjacent the opposite ends of the segmental guard 24. When the device is used as a pump, with the roller 17 rotating in a clockwise direction looking at Fig. 2, an arcuate recess 32 is preferably provided in the casing along the outer periphery of the ring 15. This recess is connected to the port 28 (which is then the exhaust port), by means of a port 33, so that fluid under pressure is admitted to the recess 32 to urge the inner wall of the ring against the outer wall of the roller and maintain an efficient sealing contact therebetween. The rolling seal is effectively maintained since the area of recess 32 may be slightly greater than the internal area of the ring 15 that is exposed to fluid under pressure. This not only maintains the rolling seal but establishes hydraulic balance of the revolving ring 15, thus eliminating the friction of the pumping or radial load, or pressure, of the outside of ring 15 against the peripheral wall of the cylindrical recess 11. The provision of means such as the recess 32 is useful also when the pump is employed for creating a vacuum, since then the recess 32 is open to atmospheric pressure the same as the internal area of the ring opposite the recess so that the larger area of the recess 32 again functions to maintain the load on the rolling seal.

In order to prevent leakage of oil along the shaft 18 the shaft is herein provided with peripheral grooves 36 and 37. These grooves are continuously exhausted by means of ports 38 and 39, respectively, (Fig. 3) which lead back to the intake port 27.

The chamber 12 in the casing is preferably filled with a suitable lubricant and in order to prevent leakage of this lubricant out along the shaft through the right hand end of the casing (Fig. 1) a rotary mechanical seal 40 is provided. This seal is shown as comprising a collar 41 bearing against the end of the hub 14, an apertured cup shaped member 42 surrounding the collar, packing material 43 intermediate the collar and the bottom of the cup member, a tubular member 44 having an end wall 45 bearing against a bushing 46 threaded in the end of the casing part 10, packing material 43' in the tubular member 44 against the inside of the end wall, a washer 47 positioned in the tubular member against the packing material 43', a coiled spring 48 positioned intermediate the washer 47 and a second washer 47', a split ring 48' positioned in a groove in the inner wall of the tubular member 44 to retain the washer 47' in place, and a coiled spring 49 surrounding the cup shaped member 42 and tubular member 44 and positioned intermediate outwardly extending flanges on said members. The coiled spring 49 serves to keep the collar 41 and end wall 45 in sealing engagement with the end of the hub 14 and the bushing 46, respectively, and at the same time takes up the packing material 43 against the shaft 18. The coiled spring 48 takes up the packing material 43' against the shaft. Preferably the packing material is a rubber compound so that it adheres to or "freezes" to the shaft.

In the form illustrated in Figs. 5 and 6, a casing is shown comprising parts 50 and 53 having cooperating annular surfaces 50' and 53' which are clamped together by means of screw devices 54 to provide a unitary structure. The casing part 50 is provided with a cylindrical portion 51 which extends part way into a cylindrical recess 55 in the part 53 and carries a segmental guard 52 which extends from the cylindrical portion 51 to the other end of the cylindrical recess 55. The casing parts thus cooperate to form a cylindrical chamber for the pumping mechanism.

A ring type rotor 56 is rotatably mounted in said chamber and is arranged to be driven by means of a roller 48, splined on the end of a shaft 59. This shaft is rotatably mounted in a bore 60 which extends through the left hand end of the casing part 50 (Fig. 5) and an elongated hub 61 formed integrally therewith. In this form of the invention the drive shaft has a flat end fitting against the casing part 53. The intermeshing splines and recesses on the rotor and roller may be of the same form as those illustrated in Figs. 2 and 7, and will be described more particularly hereinafter.

The shaft 59 is provided with a circumferential groove 65 which may be vented to the intake port in the manner illustrated in Fig. 3, to prevent leakage along the shaft. In order to prevent leakage of lubricant from the casing chamber 66 to the outside of the casing a mechanical sealing device 67 is preferably provided. As illustrated in Fig. 5, this seal comprises a pair of oppositely positioned tubular members 68 and 69 having end walls 68' and 69' in rotary engagement with the end of the hub 61 and a bushing 79, respectively. The bushing 70 surrounds the shaft 59 and is threaded into the end of the casing part 50. A coiled spring 71 is positioned surrounding the tubular members with its opposite ends in engagement with outwardly extending flanges 72 and 73 on said members to maintain the members in sealing engagement with the hub and bushing respectively. Packing material 74 and 74' positioned within the tubular members is maintained in sealing engagement with the shaft by means of washers 75 and 75' and a coiled spring 76 positioned therebetween.

The rolling seal is preferably preloaded mechanically to a slight extent by having the radius of the roller practically equal to the minimum distance between the axis of the shaft 18 and the inner surface of the ring 15, and by having the radius of the tops of the splines 19 practically equal to the minimum distance between the axis of the shaft 18 and the bottoms of the grooves 16. This, together with the fluid means for maintaining the proper pressure on the parts forming the seal, (which eliminates radial load or pressure of the ring against the periphery of the cylindrical recess), and the wear resisting principle of the rolling action, provides a device capable of producing an extremely high pressure in the exhaust port and a very high vacuum in the suction port, and also insures unusually quiet operation with no vibration. Furthermore with the splines and recesses formed as herein illustrated the roller and rotor are self-emptying, the fluid being entirely emptied ahead of the rolling seal, through the outlet port.

In order to balance the end thrust on the rotor and roller as a result of the fluid under pressure in the exhaust port, recesses 62 may be provided in the casing part 53 opposite the ends of the intake and exhaust ports 63. Similarly in the form of the invention illustrated in Figs. 1 to 4, recesses 62' are provided in the casing part 9 opposite the ends of the intake and exhaust ports 27 and 28. The recesses opposite the exhaust ports permit fluid under pressure to build up so as to counteract the effect of the pressure in the exhaust port against the rotating parts. As illustrated in Figs. 3 and 4, the port 38 communicates with the recess 62' opposite the intake port.

In the form illustrated in Figs. 8 to 10, the invention is embodied in a pump having a casing comprising parts 70 and 71, the part 70 having a cylindrical recess 72 therein in the inner end of which a ring 73 is rotatably mounted. A bearing or supporting member 74 has a cylindrical end 75 extending into the recess 72 so as to form a pumping chamber 76 intermediate the inner end of the member 74 and the end wall of the recess 72, and carries a segmental guard portion 77 projecting into said pumping chamber. A shaft 78 is rotatably mounted in the member 74 eccentrically thereof and at one end projects into the pumping chamber 76 and at its other end projects out of the casing part 71 to form a driving connection. The ring 73 may be of the form of the ring 15, as illustrated in Fig. 7, a splined roller 79 being mounted on the shaft 78 and secured thereto by means of a key 80 and a split ring 81, for operative engagement with the ring.

The cylindrical portion 75 of the supporting member 74 is relatively long so as to form a pilot for the guard 77, which will eliminate any tipping movement of the supporting member when it is clamped in place. As illustrated most clearly in Fig. 10, a shoulder 83 is formed on the casing part 70 concentric with the shaft 78 and a suitable gasket 84 is positioned intermediate said shoulder and a flange 85 on the member 74. A dowel pin 86 is preferably secured to the flange 85 and arranged to engage in a recess 87 in order to insure the proper assembly of the parts after they have once been taken apart. The casing part 70 has an attaching flange 87 provided with a plurality of bolt holes 88 and has a threaded portion 89 concentric with the shaft 78 in which the adjacent end of the casing part 71 is secured. The casing 71 serves as a nut to clamp the flange 85 to the casing part 70, the end 90 of the part 71 engaging the adjacent side of the flange 85. The part 71 is preferably hollow, and a mechanical seal 67 of the type illustrated in Fig. 5 is provided for preventing leakage out along the shaft 78.

In this form of the invention the casing part 70 has laterally projecting portions 70' and 70'' which contain inlet and outlet ports 93 and 94 and are adapted at their outer ends for connection to suitable conduits. The inner ends of these ports communicate with the chamber 76 on opposite sides of the rolling seal between the roller 79 and ring 73. Preferably an arcuate recess 95 is provided similar to the recess 32 of Figs. 1 and 2, so that pressure fluid from the outlet port will be admitted to maintain a load on the rolling seal, and balancing recesses 101 are formed in the casing part 70 opposing the inner ends of the ports 93 and 94. As illustrated herein, any fluid leaking along the shaft 78 flows into an annular groove 96 in the shaft and is exhausted therefrom through a longitudinally extending groove 97, a radial port 98, an axial port 99 and a port 100 in the casing member 70 which communicates at its outer end with the suction portion of the pumping chamber.

It is believed readily apparent that with the construction disclosed herein a highly efficient pump capable of producing extremely high pressures and vacuums is obtained. In the particular forms illustrated the splines on the rollers are in the form of the addendum only of true involute teeth. The splines are spaced apart so that in effect one or more teeth are removed, thus obtaining a rolling seal in between the splines without losing the efficiency of the splines for timing. As illustrated in Fig. 7, the periphery or pitch diameter of the roller 17 is in rolling contact with the inside surface or pitch diameter of the ring 15, and the top of the splines are in rolling contact with the surfaces 16' which are on the root diameter of the ring. Thus the pitch diameters of the two rotary elements, together with the tops of the splines on one and the root diameter of the other, provide a rolling seal therebetween.

By preloading the pumping elements mechanically and loading them hydraulically, which elements engage with a rolling action, an extremely efficient seal is obtained. This provides for high mechanical as well as volumetric efficiency. Furthermore, inasmuch as the pumping load is on the roller 17, the fluid being propelled by the splines through the space between the roller and segmental guard, this entire load is on an element which is directly connected to and driven by the shaft 18.

I claim as my invention:

1. A pump comprising, in combination, a casing having a cylindrical chamber therein, and inlet and exhaust ports communicating with said chamber, a ring type rotor rotatably mounted in said chamber and having a plurality of peripherally spaced transversely extending straight recesses on its inner surface, a drive shaft rotatably mounted in said casing eccentrically of said chamber, a roller fixed on said shaft to rotate therewith and having a plurality of splines adapted to mesh with said recesses, the tops of the splines and the intermediate portions of the roller being formed to have a rolling contact with the inner periphery of said ring, a stationary segmental guard intermediate the disengaged portions of the ring and roller, said casing having an arcuate recess in the peripheral wall of said chamber adjacent the exhaust port and extending a predetermined distance beyond the sealing zone of the roller toward the instake port, and a port connecting said recess with the exhaust port so as to admit fluid under pressure against the outer periphery of said ring to counteract the pressure of the fluid internally of the ring and maintain a predetermined rolling contact pressure between the parts.

2. A rotary engine comprising, in combination, a casing having a cylindrical chamber therein and inlet and exhaust ports communcating with said chamber, a ring type rotor rotatably mounted in said chamber and having a plurality of peripherally spaced transversely extending recesses in its inner surface, a drive shaft rotatably mounted in said casing eccentrically of said chamber, a roller carried on said shaft and driven thereby and adapted to roll with a sealing contact on the inner periphery of said ring, and having a plurality of splines adapted to mesh with said recesses, said splines having the form of the addendum only of involute teeth with the tops of the splines formed to roll with a sealing contact on the bottoms of the recesses, a segmental guard intermediate the disengaged portions of the ring and roller, said ring and roller being mounted on axes positioned so that there is a mechanical load on the rolling seal therebetween, and fluid pressure means for maintaining a load on the rolling seal.

3. A rotary engine comprising, in combination, a casing having a cylindrical chamber therein and inlet and exhaust ports communicating with said chamber, a ring type rotor rotatably mounted in said chamber and having a plurality of peripherally spaced transversely extending recesses in its inner surface, a drive shaft rotatably mounted in said casing eccentrically of said chamber, a roller carried on said shaft and driven thereby and adapted to roll with a sealing contact on the inner periphery of said ring to form a progressive rolling seal, and having a plurality of splines adapted to mesh with said recesses, said splines and recesses having the form of the addenda only of involute teeth with the tops of the splines formed to roll with a sealing contact on the bottoms of the recesses, a segmental guard intermediate the disengaged portions of the ring and roller, and means for maintaining a pressure on the parts forming the rolling seal at a point adjacent the rolling seal.

4. A rotary engine comprising, in combination, a casing having a cylindrical chamber therein and inlet and exhaust ports communicating with said chamber, a ring type rotor rotatably mounted in said chamber and having a plurality of peripherally spaced transversely extending recesses in its inner surface, a drive shaft rotatably mounted in said casing eccentrically of said chamber, a roller carried on said shaft and driven thereby and adapted to roll with a sealing contact on the inner periphery of said ring, and having a plurality of splines adapted to mesh with said recesses, said splines having the form of the addenda only of involute teeth with the tops of the splines formed to roll with a progressive sealing contact on the bottoms of the recesses, and a segmental guard intermediate the disengaged portions of the ring and roller.

5. A rotary engine having, in combination, a casing comprising parts having cooperating annular clamping surfaces, one part having a cylindrical recess therein, and another part having a flat ended cylindrical portion projecting from one end thereof into said recess so as to form a pumping chamber in the bottom of the recess, and having a segmental guard projecting into said chamber, a ring positioned in said chamber surrounding said guard, a shaft rotatably mounted in one of said parts eccentrically of said chamber, a roller carried on said shaft adapted to roll with a progressive sealing contact on the inner periphery of said ring to form a progressive rolling seal, said roller and ring having interengaging splines and grooves with the splines formed as addenda only of involute teeth, and inlet and exhaust ports in said casing communicating at their inner ends with said chamber on opposite sides of the rolling seal.

6. In a device of the character described cooperating pumping elements comprising a ring type rotor having circumferentially spaced recesses in its inner surfaces with concave cylindrical bottoms and concave cylindrical surfaces intermediate the recesses, a roller positioned eccentrically within said rotor having splines with the shape of the addendum only of an involute tooth adapted to mesh with the recesses in said rotor, the ends of said splines having convex surfaces, and convex cylindrical surfaces intermediate said splines whereby the convex surfaces of the roller engage the concave surfaces of the rotor to roll thereon and form a continuous mechanical seal, and means for supplying fluid discharged by the pumping elements to the exterior of said ring type rotor at a point radially outward from said rolling mechanical seal to counteract the pressure of the fluid internally of the ring and maintain a predetermined rolling contact pressure between said elements.

7. A rotary engine comprising, in combination, a casing having a cylindrical chamber therein and inlet and exhaust ports communicating with said chamber, fluid handling mechanism in said chamber comprising two parts, one of said parts taking the form of a rotor rotatably mounted in said chamber and the other of said parts taking the form of a roller eccentrically mounted in said rotor and adapted to roll with a sealing contact on the inner periphery of said rotor, a plurality of recesses formed in one of said parts and a plurality of splines formed on the other of said parts adapted to mesh with said recesses, said splines having the form of the addendum only of an involute tooth with the tops of the splines formed to roll with a progressive sealing contact on the bottoms of the recesses, and a segmental guard intermediate the disengaged portions of the rotor and roller.

8. A rotary engine comprising, in combination, a casing having a cylindrical chamber therein and inlet and exhaust ports communicating with said chamber, fluid handling mechanism in said chamber comprising two parts, one of said parts taking the form of a rotor rotatably mounted in said chamber, the other of said parts taking the form of a roller eccentrically mounted within said rotor, one of said parts having formed there in a plurality of peripherally spaced, transversely extending recesses, the other of said parts having formed thereon a plurality of peripherally spaced, transversely extending splines adapted to mesh with the recesses during the rotation of the parts, said splines and recesses having the form of the addendum only of an involute tooth with the tops of the splines formed to roll with a sealing contact on the bottoms of the recesses and the portions of the parts intermediate the splines and receses being cylindrical and rolling on one another so that the roller rolls on the inner periphery of the rotor with a sealing contact to form a progressive rolling seal, a drive shaft rotatably mounted in said casing eccentrically of said chamber and having the roller fixed thereon, and a segmental guard intermediate the disengaged portions of the rotor and roller.

9. A rotary engine comprising, in combination, a casing having a cylindrical chamber therein and inlet and exhaust ports communicating with said chamber, fluid handling mechanism in said chamber comprising a rotor rotatably mounted in said chamber and a roller eccentrically mounted within said rotor and adapted to roll with a sealing contact on the inner periphery of said rotor, complementary and intermeshing means in the form of circumferentially spaced splines and recesses, one form of said intermeshing means being formed on the rotor and the complementary form of said intermeshing means being formed on the roller, said complementary means formed on the roller being spaced apart a distance measured on the circumference of the roller which is greater than the maximum circumferential width of an individual one of said means, said splines having the form of the addendum only of an involute tooth with the tops of the splines formed to roll with a progressive sealing contact on the bottoms of the recesses, and a segmental guard intermediate the disengaged portions of the rotor and the roller.

GUNNAR A. WAHLMARK.